UNITED STATES PATENT OFFICE.

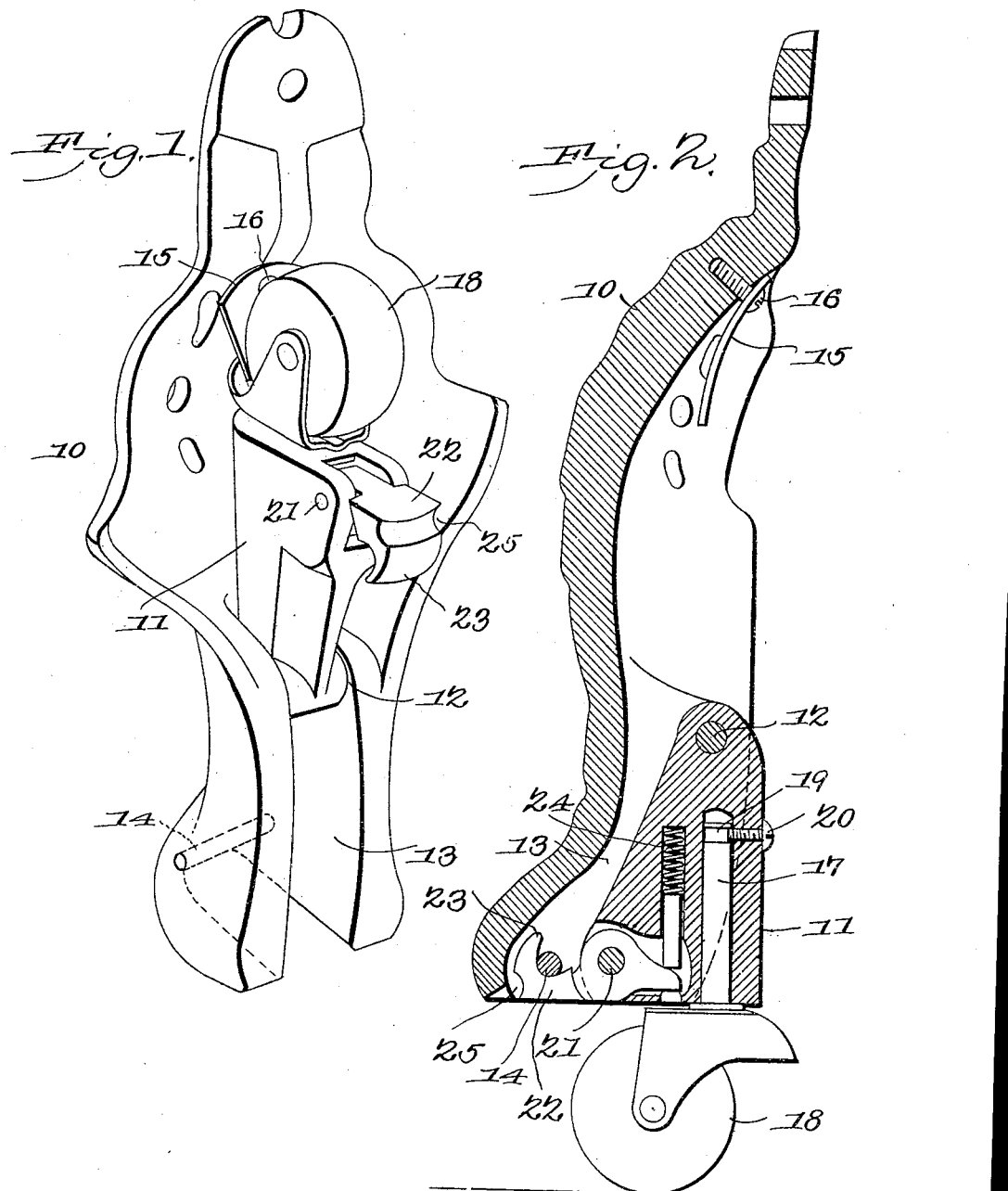

WILLIAM PETERS, OF MELVIN, ILLINOIS, ASSIGNOR OF ONE-HALF TO WILLIAM STATHERS, OF MELVIN, ILLINOIS.

STOVE-LEG CASTER.

No. 814,562.　　　Specification of Letters Patent.　　　Patented March 6, 1906.

Application filed January 9, 1905. Serial No. 240,260.

*To all whom it may concern:*

Be it known that I, WILLIAM PETERS, a citizen of the United States, residing at Melvin, in the county of Ford and State of Illinois, have invented a new and useful Stove-Leg Caster, of which the following is a specification.

This invention relates to the supporting members of stoves, ranges, and the like, and has for its object to provide a folding caster attachment to structures of this character, which may be withdrawn when not required and projected when the structure is to be moved from place to place.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention, capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of a stove-leg viewed from the rear, with the caster attachment in folded or withdrawn position. Fig. 2 is a longitudinal sectional elevation of the same with the caster attachment in projected position.

The improved device may be employed upon any structure requiring casters upon its supporting members to facilitate the moving from place to place, more particularly to stoves, ranges, and similar structures, which are moved only at relatively long intervals and which require to stand steadily when in use, and for the purpose of illustration the attachment is shown upon a conventional form of a stove-leg 10; but it will be understood that the invention is not necessarily limited to stove-legs, but may be employed upon any structure requiring such a device.

The improved attachment comprises an arm 11, pivoted at 12 upon the supporting member 10 and swinging vertically in a guideway or recess 13 therein, as indicated in Fig. 1. The member 10 has a stationary transverse stop 14 within the guideway 13, and also provided with a stop 15, pivoted at 16, to swing from the member 10 near the upper end. The arm 11 is provided with a socket in which the pin 17 of a caster 18 is mounted for rotation and held from displacement by a clamp-screw 20, engaging a groove 19 in the pin 17, as shown in Fig. 2. The caster is thus free to rotate upon the arm, but cannot move longitudinally of the same.

Pivoted at 21 in a recess in the arm 11 is a catch member 22, having a hooked terminal 23 for engaging the transverse stop 14 when the arm is disposed in its lower or projected position, as in Fig. 2, the catch member held yieldably in position by a spring 24, actuating a pin, which bears on the catch member. A small cavity or recess 25 is formed in the free end of the member 22 to receive a screw-driver or other implement to release the spring-controlled catch.

The frame portion of the caster is adapted to be engaged by the movable stop 15 when the arm 11 with its caster is disposed in elevated position, as represented in Fig. 1, and thus hold the same concealed in the rear of the member 10 and out of the way when not required. The inclined outer face of the hooked portion 23 causes the member 22 to automatically engage the stop 14 when the arm 11 is "snapped" into its projected position, as in Fig. 2, as will be obvious.

The device is simple in construction, can be inexpensively manufactured, and is applicable with slight and immaterial modifications to any structure requiring the same.

The attachment is entirely concealed when not in use, and its presence therefore does not detract from the appearance of the structure or interfere with its ordinary use.

Having thus described the invention, what is claimed is—

1. The combination with a supporting member having a transverse stop near the lower end and movable stop spaced from said transverse stop, of an arm pivoted to said supporting member between said stops and provided with a caster in the free end, a spring-controlled trip-catch connected to said arm for yieldable engagement with said transverse stop when said arm is extended, and means for engaging said arm with said movable stop when the arm is disposed in elevated position.

2. A hollow stove-leg having a housed stop near its lower end, an arm pivoted in the cavity of said stove-leg and provided with a caster at its free end, and a spring-controlled catch carried by the arm for yieldable engagement with said stop when the arm is extended, said catch being housed when in its operative position.

In testimony that I claim the foregoing as my own I have hereto affixed my signature in the presence of two witnesses.

WILLIAM PETERS.

Witnesses:
WM. STATHERS,
JAS. S. THOMPSON.